3,069,321
CHOLINE SALICYLATE COMPOSITION
AND METHODS OF USE
Robert H. Broh-Kahn, Hastings on Hudson, and Ernest J. Sasmor, New York, N.Y., assignors to Laboratories for Pharmaceutical Development, Inc., Yonkers, N.Y., a corporation of New York
No Drawing. Filed Apr. 4, 1960, Ser. No. 19,453
9 Claims. (Cl. 167—65)

The invention relates to new pharmaceutical compositions. In particular, it describes choline salicylate and preparations containing the same. Further described are the process for elevating salicylate levels in the blood, dosage forms and physiological effects of administration of the compound.

Although many salicylates have been described for use in clinical medicine, most of them have drawbacks which seriously limit their utility. For example, aspirin, the most widely employed salicylate preparation, is not stable in aqueous formulations. It also produces gastric distress in an appreciable number of subjects. Such distress is quite commonly observed following the administration of most salicylate compounds which necessitates either lowering the dosage employed or eliminating the drug. This may present a serious problem where patients require high dosage levels to obtain an optimal therapeutic effect. For example, in the rheumatic fever, the patient often receives dosage levels as high as 8–12 grams per day. Aspirin also causes an erosive gastritis and has been implicated as the cause of serious hemorrhage in the gastrointestinal tract. It is definitely contraindicated therefore in many cases including ulcers and colitis.

Other limitations concerned with the well-known insolubility of salicylic acid compounds necessitate the use of the alkali metal salts. Thus, sodium salicylate is much more soluble than aspirin and, incidentally, may be less apt to cause more gastrointestinal distress. However, the presence of sodium ion makes this product contraindicated for those patients having cardiovascular diseases complicated by water retention. Still further limitations in available salicylates are disclosed below.

The formulation of organic derivatives of salicylic acid has resulted in small success in ameliorating these basic problems associated with the parent compound. Because of the high dosage of salicylate required and the long range therapy which is indicated, the choice of solubilizing organic component is very important.

Choline salicylate is a well-defined crystalline compound melting at 49.5° C. to 50.5° C. It analyzes in excellent agreement with the theoretical values for carbon, hydrogen and nitrogen content. A ten percent aqueous solution (w./v.) has a pH of 6.75 and does not liberate free salicylic acid above pH 3.5. Choline salicylate is extremely soluble in water, alcohol, acetone and glycerine, but insoluble in anhydrous ether, benzene and petroleum ether. The compound is hygroscopic and discolors on exposure to light. It is incompatible with strong acids, iron salts and strong alkalies. The structural formula for choline salicylate may be represented as follows:

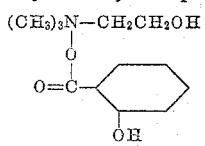

The molecular weight of the compound is 241.28 and it may be designated as the (2-hydroxyethyl) trimethylammonium salt of o-hydroxy benzoic acid. The aqueous solution is stable.

A method of preparation is to react an acid salt of choline (such as choline chloride or choline bromide) with an alkaline salt of salicylic acid (such as sodium salicylate, potassium salicylate, or magnesium salicylate) in an alcoholic media.

Choline salicylate may be used in clinical medicine for humans and animals, as a means of elevating the blood level of salicylates. It may be employed whenever salicylate therapy is indicated. Its present maximum utility therefore lies in its property as an analgesic agent, as an antipyretic agent and as an agent useful in the treatment of arthritic and rheumatic conditions.

The extreme solubility of choline salicylate has been mentioned above. It would appear to be the most highly water-soluble of the known salicylates. The saturated solution in water is 97% by weight choline salicylate and 3% by weight water. Its solutions are stable and thus provide an excellent means for administering the drug, especially to those patients who find it difficult to ingest tablets such as children, older persons, those whose have physical obstructions, etc. This ability to administer large amounts of salicylates in relatively small volume (even if one considers that the salicyl moiety in choline salicylate is 43%) is especially useful in the treatment of conditions such as rheumatoid arthritis, wherein large quantities of salicylates must be taken. Of course, aspirin is insoluble in water, and the liquid salicylates previously known have a higher index of irritation and incidence of side effects than choline salicylate, and some, such as sodium salicylate, are contraindicated by reason of their sodium ion content in many conditions.

When it is desired to administer choline salicylate to a patient it is preferably given in aqueous media for liquid oral use. Choline salicylate may also be dispersed in an ointment base to be used topically where it causes a rapid absorption into the blood stream through the skin to provide a desirable therapeutic clinical effect.

The toxicity of choline salicylate in laboratory animals has been determined. The acute oral toxicity in rats, as estimated by conventional procedures and expressed in terms of the $LD_{50}$ is $1.53 \pm 0.15$ grams/kg. body weight, a figure which approximates closely the $LD_{50}$ reported for acetylsalicylic acid. It has been administered daily to rats and dogs in dosages as high as 0.5 gram/kg. body weight, for a period of six months without eliciting any clinical evidences of toxicity or other signs of intolerance. By contrast, a dosage of 40 grains of acetylsalicylic acid per day to a patient weighing 70 kg. may be expressed as 0.038 gram/kg. body weight. Choline salicylate may therefore be considered non-toxic according to conventional usage of the term.

One of the outstanding characteristics of the present invention is that solutions of choline salicylate have an onset of action which would appear to be five times faster than that of aspirin. In one study, a solution of choline salicylate in water (each teaspoon, i.e. 5 ml., containing 870 mg. choline salicylate equivalent to 10 gr. (650 mg. of aspirin) was administered to 20 patients, the dosage being 10 ml. of choline salicylate solution and the control being aspirin tablets in equivalent dosage. In each instance the drug was given in the fasting state in 100 ml. of water. Patients were both rheumatoid and normal volunteers. No patient received salicylates for at least three days prior to the administration of either drug. Blood salicylate levels were determined at 10, 30 and 60 minutes after ingestion of either drug and were estimated according to the method of Keller, W. J.: A Rapid Method for the Determination of Salicylates in Serum of Plasma, Am. J. Clin. Path. 17:415–417, 1957. The results were as follows (the first five numbered results are taken from patients each of whom received both choline salicylate and aspirin in different test periods, the others are from pairs of subjects, one of each pair having received choline salicylate only, whereas the other of the pair received only aspirin, the last three subjects received choline salicylate only):

*Table 1*

[Total serum salicylate levels (mg. percent) in 11 "paired" and three other subjects (see text) after oral administration of equivalent amounts (500 mg. salicylate) of choline salicylate and acetylsalicylic acid]

| Pair or subject | Time after administration | | | | | |
|---|---|---|---|---|---|---|
| | 10 minutes | | 30 minutes | | 60 minutes | |
| | Chol. sal. | ASA | Chol. sal. | ASA | Chol. sal. | ASA |
| 1 [1] | 9.8 | 0.2 | 13.0 | 0.2 | 15.0 | 1.4 |
| 2 [1] | 6.0 | 0.2 | 7.6 | 0.2 | 9.1 | 1.7 |
| 3 [1] | 9.2 | 0.2 | 13.8 | 1.4 | 12.1 | 4.7 |
| 4 [1] | 11.6 | 0.2 | 14.2 | 0.7 | 13.1 | 4.0 |
| 5 [1] | [2] 12.0 | [2] 4.4 | 12.2 | 5.2 | 10.8 | 6.0 |
| 6 | [2] 13.5 | 0.2 | 9.0 | 0.2 | 8.8 | 1.4 |
| 7 | [2] 1.2 | 0.2 | 4.0 | 5.8 | 9.0 | 1.7 |
| 8 | 3.7 | [2] 4.7 | 7.6 | 5.5 | 12.5 | 9.4 |
| 9 | [2] 6.3 | 0.2 | 11.8 | 1.4 | 13.7 | 0.5 |
| 10 | 14.3 | [2] 0.8 | 20.0 | 1.0 | 13.2 | 2.2 |
| 11 | 11.8 | [2] 0.7 | 14.2 | 8.6 | 13.1 | 6.0 |
| 12 | 10.3 | | 13.0 | | 14.0 | |
| 13 | 6.3 | | 10.9 | | 8.6 | |
| 14 | [2] 10.0 | | 16.0 | | 22.0 | |
| Mean | 9.0 | 1.1 | 11.7 | 2.7 | 12.4 | 3.5 |

[1] These subjects received both drugs.
[2] Patient with diagnosis of rheumatoid arthritis. All others were "normal" volunteers.

It is seen in Table 1 that ten minutes after the administration of 10 ml. of choline salicylate the mean salicylate blood level was approximately 9 mg. percent and that a peak level of about 12 mg. percent was reached in thirty minutes. On the other hand, when an equal amount of salicylate was given in the form of aspirin, the mean blood level had reached only 3.5 mg. percent at the end of sixty minutes. Comparing the mean levels, it is evident that choline salicylate is absorbed much more rapidly than aspirin. The relative blood salicylate levels after choline salicylate and aspirin exceed 8:1 in ten minutes, 4:1 in thirty minutes, 3:1 in sixty minutes.

Another study which established the fact that choline salicylate was much more rapidly absorbed than aspirin was made by administering the drugs to twelve normal fasting subjects with 120 ml. of water. The drugs used were two tablets of aspirin containing 650 mg. of acetylsalicylic acid and 8.6 ml. flavored solution containing 101.9 mg. of choline salicylate per ml. equivalent in salicylate content to the aspirin. Blood samples were taken at 10, 20, 60, 120 and 360 minutes after the administration, the blood was oxalated, the plasma separated by centrifugation, and the total salicylate levels were then determined. The results obtained are set forth in the following table:

*Table 2*

[Relative plasma levels (mg./liter) of salicylate (total) after the oral administration of aspirin or choline salicylate]

| Subjects | 10 minutes | | 20 minutes | | 60 minutes | | 120 minutes | | 360 minutes | |
|---|---|---|---|---|---|---|---|---|---|---|
| | Asp. | Chl. sal. | Asp. | Chl. sal. | Asp. | Chl. sal. | Asp. | Chl. sal. | Asp. | Chl. sal. |
| A | 4.2 | 26.7 | 6.7 | 23.7 | 19.7 | 26.8 | 28.6 | 14.2 | 18.3 | 13.4 |
| B | 2.8 | 25.5 | 8.6 | 20.9 | 22.8 | 24.3 | 25.3 | 18.1 | 14.7 | 10.3 |
| C | 1.9 | 3.9 | 10.5 | 10.3 | 17.8 | 33.0 | 24.4 | 27.4 | 14.2 | 12.3 |
| D | 7.8 | 26.7 | 13.7 | 32.8 | 22.0 | 30.5 | 27.6 | 22.8 | 12.3 | 16.9 |
| E | 4.7 | 61.1 | 18.1 | 73.7 | 27.9 | 44.1 | 36.8 | 41.6 | 24.0 | 40.8 |
| F | 21.8 | 45.9 | 41.6 | 52.8 | 42.4 | 36.9 | 10.1 | 36.1 | 13.4 | 21.1 |
| G | 16.1 | 45.0 | 32.5 | 41.4 | 50.0 | 38.6 | 51.4 | 27.9 | 25.8 | 18.7 |
| H | 10.6 | 38.9 | 11.4 | 55.6 | 26.5 | 38.1 | 32.1 | 30.6 | 7.0 | 15.0 |
| I | 12.5 | 35.8 | 28.1 | 35.8 | 38.6 | 30.2 | 42.3 | 29.6 | 25.5 | 14.2 |
| K | 2.0 | 52.3 | 5.0 | 47.3 | 17.9 | 34.7 | 15.9 | 35.6 | 10.9 | 18.6 |
| L | 2.2 | 50.0 | 7.3 | 50.3 | 26.5 | 36.1 | 23.2 | 27.2 | 11.4 | 11.4 |
| M | 8.4 | 27.6 | 11.9 | 27.9 | 36.4 | 32.4 | 68.1 | 15.6 | 13.3 | 10.9 |
| Mean | 7.5 | 36.6 | 16.3 | 39.4 | 29.0 | 33.8 | 32.2 | 27.2 | 15.9 | 17.0 |

It is readily apparent that choline salicylate is absorbed at a very rapid rate and approximately five times more rapidly so than aspirin. Thus, at the end of 10 minutes, the plasma total salicylate levels after choline salicylate were approximately five times as high as after acetylsalicylic acid.

Statistical analysis of these data reveals extremely significant differences between these rates of absorption of the two drugs. The results of an analysis of variance, with three sources of variation (the times at which the blood levels were drawn, the differences between the two drugs and between the subjects themselves), are presented in Table 3 and amply confirm the fact that the differences between the two drugs contribute to a highly significant degree ($P<0.001$) to the differences between the mean salicylate levels illustrated in FIGURE 1.

*Table 3*

[Analysis of variance of plasma salicylate levels in Table 2]

| Source of variation | Degrees of freedom | Sum of squares | Mean square | Computed F |
|---|---|---|---|---|
| Main effects: | | | | |
| Among subjects | 11 | 5,233.63 | 475.78 | [1] 5.38 |
| Between drugs | 1 | 3,332.75 | 3,332.75 | [1] 37.70 |
| Among times | 4 | 3,617.29 | 904.32 | [1] 10.23 |
| First order interactions: | | | | |
| Subjects x drugs | 11 | 3,538.47 | 321.68 | [2] 3.64 |
| Subjects x times | 44 | 1,552.96 | 35.29 | (3) |
| Times x drugs | 4 | 5,097.43 | 1,274.36 | [2] 14.41 |
| Error | 44 | 3,890.17 | 88.41 | |
| Total | 119 | 26,262.70 | | |

[1] $P<0.001$. [2] $P<0.01$. [3] Not significant.

Further analysis, as in Table 4, emphasizes this and other facts.

*Table 4*

[Significance of differences between mean plasma salicylate levels (Table 2) after choline salicylate and aspirin at various times]

| | 10 min. | 20 min. | 60 min. | 120 min. | 360 min. |
|---|---|---|---|---|---|
| P | <0.01 | <0.05 | (1) | (1) | (1) |

[1] Not significant.

It is obvious that the differences between the higher mean plasma salicylate levels after choline salicylate and the lower mean levels after acetylsalicylic acid are highly significant and significant at the 10 and 20 minute intervals ($P<0.01$; $P<0.05$) but not significantly dissimilar at 60, 120 and 130 minutes. In other words, although choline salicylate is obviously absorbed at a much more rapid rate than acetylsalicylic acid, it maintains plasma salicylate levels equally as well for as prolonged a period as the latter. Thus, since the plasma salicylate levels are so much higher after choline salicylate during early stages after its ingestion and not dissimilar to those after acetylsalicylic acid during the later period, it is apparent that the mean plasma salicylate level after choline salicylate is significantly higher than that after aspirin for a minimum period of at least six hours after ingestion of equivalent quantities of either drug.

Other equally interesting facts are revealed by further statistical analysis of the data in Table 2.

Table 5 demonstrates the lack of significant differences between the plasma salicylate levels after administration of choline salicylate at 10 and those at 20, 60 and 120 minutes. In other words, since these levels do not differ significantly from one another, peak plasma salicylate levels are attained as early as 10 minutes after ingestion of choline salicylate as contrasted to the 120 or more minutes required to attain such peak levels after aspirin. In contrast, the levels at 120 minutes after aspirin are significantly higher than those at 10 minutes. Thus, choline salicylate not only is absorbed five times more rapidly than acetylsalicylic acid, but it also elicits peak plasma salicylate levels at least 12 times more rapidly than aspirin.

Table 5

[Significance of differences between plasma salicylate levels (Table 2) after choline salicylate and aspirin at various times]

| Times | Probability values (P) choline salicylate | Aspirin |
| --- | --- | --- |
| 10 vs. 20 minutes | (¹) | (¹) |
| 10 vs. 60 minutes | (¹) | <0.01 |
| 10 vs. 120 minutes | (¹) | <0.01 |
| 10 vs. 360 minutes | <0.01 | (¹) |
| 20 vs. 60 minutes | (¹) | <0.05 |
| 20 vs. 120 minutes | <0.05 | <0.05 |
| 20 vs. 360 minutes | <0.01 | (¹) |
| 60 vs. 120 minutes | (¹) | (¹) |
| 60 vs. 360 minutes | <0.01 | <0.05 |
| 120 vs. 360 minutes | <0.05 | <0.01 |

¹ Not significant.

Such demonstrations of the incomparably more rapid rate of absorption of choline salicylate than of aspirin have subsequently been repeatedly confirmed. Comparison of these and other data indicate that choice salicylate is much more rapidly absorbed not only than acetylsalicylic acid but also more so than other salicylates also alleged to be more rapidly absorbed than aspirin, namely the so-called "buffered aspirin" and the so-called "soluble aspirin" or calcium acetylsalicylic acid carbamide.

Generally speaking, the above and other studies conducted with choline salicylate indicate that blood concentration of salicylate was achieved much more rapidly after administration of choline salicylate than with aspirin, and that significant blood levels are encountered in approximately one-fifth of the time required by aspirin, while the peak or maximum effectiveness is attained in one-twelfth of the time required by aspirin.

The rapidity of therapeutic action consequent upon the rapid rise in blood salicylate levels after administration of choline salicylate and its rapid absorption renders the compound a more effective therapeutic agent in cases of treatment of acute episodes such as headaches, dysmenorrhea, reduction of fever. Even in the treatment of chronic conditions such as rheumatism and arthritis the speed of action is important in treating the characteristic early morning stiffness of these diseases.

Similarly, the fact that peak blood levels are attained earlier than after the administration of choline salicylate than by the use of aspirin means that its maximum effect, especially in the cases of the acute episodes mentioned will be obtained earlier. The fact that it is absorbed more rapidly may account for the fact that it induces no bleeding from the gastrointestinal tract and less other types of irritation than aspirin or the so-called soluble aspirin (calcium acetylsalicylate carbamide) since it remains in contact with the gastric mucosa in appreciable concentration for a much shorter period of time.

During the past few years, considerable attention has been directed to the fact that the use of aspirin by mouth is often accompanied not only by an erosive gastritis but also by the loss of blood from the gastrointestinal tract, sometimes in the nature of severe hemorrhage but more frequently in the continued loss of small quantities of blood. By an elegant and critically accurate technique investigators establish the fact that choline salicylate solutions do not cause such bleeding. They withdraw blood from subjects in whom careful examination by routine procedures has failed to reveal any evidence of bleeding from the gastrointestinal tract or any history of such in the past. The red cells in the withdrawn blood are then "labeled" or "tagged" with radioactive chromium ($Cr^{51}$) and then re-injected. This, of course, results in a fairly steady and readily determinable amount of radioactivity in the circulating blood over a minimum period of 30 days or more. If any red cells escape from the vascular system into the gastrointestinal tract, radioactivity will then appear in the stool and, by correlation between the amount of radioactivity in a given amount of blood and the radioactivity in the stool, the amount of blood in the stool can be determined with great accuracy.

Tests are run over a period of 28 days divided into four consecutive periods of 7 days each. During the first week, the subjects received no drugs. During the second week they each received one teaspoonful of choline salicylate aqueous solution (which contains 870 mgs. choline salicylate equivalent in salicylate content to 10 grains aspirin) four times a day for each of the 7 days. During the third week they are given each day two 5 grain tablets (10 grains) of aspirin four times daily. During the fourth week, once again no drug is given.

The entire stool passed during the last four days of each week is collected in weighed bottles. (No stool is collected during the first three days to allow adequate transit time in the gastrointestinal tract to make certain that any radioactivity appearing in the stool of the last four days is not the result of blood loss during the preceding week.) From the entire weighed stool so collected, a weighted aliquot is taken, emulsified in water and its radioactivity determined and by simultaneous determination of the radioactivity of a given volume of blood, the entire blood loss through the stool during the four day period can therefore readily be calculated.

In a clinical study made with a group of 50 subjects it was found that choline salicylate not only induces significantly less blood loss than does aspirin but also that its administration is attended by no more radioactivity in the stool than when no drug is being ingested. Whereas investigators established that the significant level for blood loss is 1.2 ml. per day, this being two standard deviations in excess of the mean values found by this technique in "normals" with no overt evidence of loss of blood in the stool and who are not receiving drugs, control groups during the study did not lose more than 0.5±0.5 ml. and those patients taking choline salicylate did not exceed a rate of loss of more than 0.5 ml. per day. Of course, the lack of blood loss during administration of choline salicylate is a good index of a lack of irritation by the drug since self-evidently hemorrhage comprises evidence of irritation. By contrast the mean daily blood loss in subjects receiving an equivalent amount of aspirin was 4.8 ml. with some subjects losing as much as 20 ml. per day.

Again, in cases of refractory anemia such as encountered in rheumatoid arthritis, the amount of blood loss due to aspirin and other salicylates may itself be significant. Furthermore, the fact of lack of bleeding establishes that the drug constitutes less of an insult than does aspirin and other salicylates and hence in conditions where insults may be cumulative or critical where aspirin is contraindicated choline salicylate may nevertheless present a therapeutic alternative. An instance of this is the ulcer patient in whom massive hemorrhage or severe distress may be induced. In fact, clinical studies have repeatedly demonstrated that choline salicylate is very well tolerated by patients with peptic ulcer who cannot tolerate aspirin (due to the excessive gastrointestinal distress induced by the latter).

It would appear that in many cases in which the patient is hypersensitive to aspirin, choline salicylate may present an alternative. It is estimated that there are 400,000 persons in the United States of America who are hypersensitive to aspirin, many of whom may be afforded the benefit of salicylate therapy by the use of choline salicylate where they could not take aspirin. Observations from a number of clinicians have indicated this to be the case.

There are individuals who cannot take aspirin in therapeutic dosage without experiencing pain, nausea, retching, vomiting, heartburn and other gastro-intestinal distress, while many evidence such distress when the higher dosages required in the treatment of rheumatoid arthritis and like conditions are administered. It would appear to be generally accepted that in the treatment of conditions such as rheumatoid arthritis and rheumatic fever, if one can use salicylate therapy the patients will do at least as well as the salicylate as they will do with the steroid drugs which are much more toxic generally. In such cases it is usually recommended that patients be given salicylates in higher and higher dosage until the symptoms of salicylism are experienced and then the dosage reduced just short of the production of such symptoms. Obviously, then, if while such salicylate dosages may be administered by means of choline salicylate but not by aspirin in the case of given individuals, it should be the salicylate of choice in the treatment, in such individuals, of the conditions mentioned.

In studies in which 80 investigators administered and observed the effects of choline salicylate solution in approximately 1200 patients treated daily for periods up to one year, the patients ranging in age from infants of a few months up to 80 years or more, the majority of whom were adults, treated for a variety of conditions of which rheumatoid arthritis, osteoarthritis and rheumatic fever were the most common but who suffered from other disorders including musculoskeletal disorders, gout, headache, dysmenorrhea, post-immunization pyrexia and other miscellaneous conditions, it was found that individuals have varied widely in their tolerance to choline salicylate. The maximum daily dosage reported to date to have been tolerated without side effects has been 20.9 grams, equivalent to 240 grains of acetylsalicylic acid. Tolerance to such high dosages should not be considered typical but careful clinical studies revealed that a great many patients tolerated well for prolonged periods of time daily dosages of from 7 to 10.4 grams, equivalent to 80 to 120 grains of aspirin. By contrast, most of the investigators reported that their average ambulatory patient with arthritis could not tolerate, day after day, daily dosages of acetylsalicylic acid in excess of 40 to 60 grains without the appearance of gastrointestinal distress.

The maximum tolerated dosage of choline salicylate has frequently been defined by that level at which salicylism occurs whereas the supervention of gastric distress has usually been the factor limiting the maximum tolerated dosage of acetylsalicylic acid. In other words, as the dosage of aspirin was increased, the appearance of gastric distress precluded any further increase. Thus, in at least 30% of the patients with rheumatoid arthritis, it was found impossible to administer a dosage sufficiently high to elicit the symptoms of salicylism due to the severe gastric distress appearing at a considerably lower dosage. On the other hand, as the dosage of choline salicylate was increased, the limits of tolerance were frequently attained only after appearance of salicylism and without any previous indication of gastric distress. As a consequence, it was possible to administer a sufficiently high dosage to increase the plasma salicylate levels to those values at which salicylism ensues.

A study which strikingly establishes the antipyretic action of choline salicylate was conducted by administering choline salicylate solution to 20 infants in dosages of 15 drops representing 0.127 gram of choline salicylate, which is equivalent to 1.48 grains of aspirin. The material was administered directly into the mouth, undiluted. The period of observation was 30 minutes after administration. Only one dose of the medication was administered by the mothers of infants to a group of normal healthy infants, who had had a reaction to their first injections of 0.5 cc. diphtheria-pertussis-tenanus vaccine, on the occasion of the second injection administered approximately four weeks later. Temperatures taken were rectal temperatures at 10 minute intervals. A significant drop in temperature was arbitrarily selected as 0.5° F. The mothers were instructed to note whether there was a diminution in evidences of discomfort and malaise, and the lapse of time after administration as which this occurred. The results are set forth in Table 6. Ten of the twenty results are concidered excellent, six fair and four poor. Of the poor results, probably two lost the medicine by vomiting (cases 2 and 9).

It is noteworthy that significant drops in temperature were noted in 45% of these patients as early as 10 minutes and in another 20% as early as 20 minutes after administration of choline salicylate. Such results are far more dramatic than would be anticipated from aspirin and undoubtedly are due to the much more rapid absorption of choline salicylate.

*Table 6*

[Effect of choline salicylate on febrile immunization reactions]

| Case | Age (months) | Race, sex | Symptoms at onset | | Time (minutes) for significant reduction temperature | Symptoms 30 minutes after therapy | | Result |
|---|---|---|---|---|---|---|---|---|
| | | | Temp. | Other | | Temp. | Other | |
| 1 | 4 | W-F | 101.2 | Crying | 10 | 100 | 0 | Excellent. |
| 2 | 4 | W-F | 100.4 | Fretful | (¹) | 100.8 | Fretful | Poor. |
| 3 | 5 | W-F | 102.8 | Flushed | 10 | 99.2 | 0 | Excellent. |
| 4 | 4½ | W-F | 100 | Crying | 20 | 99.6 | 0 | Fair. |
| 5 | 6 | W-M | 101.4 | 0 | 30 | 99 | 0 | Excellent. |
| 6 | 5 | W-M | 103 | Crying | 10 | 101 | 0 | Do. |
| 7 | 3½ | W-M | 100.4 | Fretful | 10 | 99.4 | 0 | Do. |
| 8 | 4 | W-F | 100.2 | do | 10 | 99.6 | 0 | Do. |
| 9 | 3 | W-F | 102.4 | Crying | (¹) | 102 | Crying | Poor. |
| 10 | 4 | W-F | 100.2 | Fretful | 10 | 99 | 0 | Excellent. |
| 11 | 6½ | W-M | 101 | 0 | 30 | 100.2 | 0 | Fair. |
| 12 | 5 | W-F | 100.4 | Crying | 20 | 99.4 | Crying | Do. |
| 13 | 5 | W-M | 100.8 | Fretful | 30 | 100 | 0 | Do. |
| 14 | 5 | W-M | 100.2 | 0 | 10 | 98.8 | 0 | Excellent. |
| 15 | 3 | W-F | 103.2 | 0 | 10 | 99.4 | 0 | Do. |
| 16 | 4½ | W-M | 100 | Crying | 10 | 99.4 | 0 | Do. |
| 17 | 4 | W-M | 100.6 | Fretful | (¹) | 100.4 | Fretful | Poor. |
| 18 | 5½ | W-M | 100.6 | Crying | (¹) | 100.2 | Crying | Do. |
| 19 | 6 | W-M | 101 | 0 | 20 | 100.4 | 0 | Fair. |
| 20 | 5 | W-M | 100.6 | 0 | 20 | 100 | 0 | Do. |

¹ No significant reduction in temperature during 30-minute period of observation.

In a study intended to evaluate the effect of the administration of choline salicylate in the relief of headache pain, a series of 28 patents received choline salicylate solution at the rate of 5 ml. every four hours (equivalent in salicylate content to 10 grains acetylsalicylic acid), except that one patient complaining of every severe headaches received two teaspoons every four hours. Twenty-five of the patients, namely 85%, reported complete relief of pain. Of the three who failed to obtain relief, one patient reported subsequent relief with either aspirin or APC and two reported that codeine and aspirin likewise failed to provide relief. In the case of the two latter patients, as was the case for many in this group, only one initial dose of choline salicylate had been administered. It is noteworthy that relief was reported to have been evident soon after the administration of the drug and much sooner than would have been expected after aspirin.

There follow examples which illustrate (but are not meant to be exhaustive) methods of making choline salicylate and formulating the same in pharmaceutical preparations.

EXAMPLE 1

To a round-bottom boiling flask fitted with a stirring apparatus and reflux condenser is added 160 grams of sodium salicylate dissolved in one liter of 99 percent isopropyl alcohol. The solution is heated to boiling; the agitation started and 140 grams of choline chloride are slowly added. When all the choline chloride has been added, the mixture is boiled under reflux for one hour and cooled to 25° C. The sodium chloride which forms is filtered and the solvent exaporated under reduced pressure. The residue is dissolved in a mixture of 350 ml. of dry acetone and 650 ml. of anhydrous ether. The acetone-ether solution is set aside to crystallize in an ice-chest overnight. The crystalline material is separated by filtration and washed with anhydrous ether and dried in a vacuum oven. The yield of choline salicylate is approximately 65 percent and the material is obtained in a high degree of purity which analyzes for nitrogen in good agreement with the theoretical value (percent nitrogen—theoretical: 5.8; found: 5.6).

EXAMPLE 2

Because of its high aqueous solubility, stable liquid preparations may be conveniently prepared. A typical formulation to provide a suggested dosage of choline salicylate per teaspoonful is as follows.

Equimolar parts of salicylic acid, USP and choline bicarbonate (in a 46% aqueous solution) are mixed, the acid being added to the solution in small portions accompanied by strong stirring, each portion being added after the effervescence caused by the introduction of the previous portion has subsided. The effervescence is caused by the evolution of $CO_2$ which is vented off. At this point this primary solution represents 16½% by volume of the total volume of the optimal product. Hence, deionized water to the extent of 83½% of the total volume may be added to obtain a finished solution. However, good practice would dictate that there be added along with the water coloring, sweetening and flavoring agents as well as preservatives. Hence, the total volume of the dilution liquids and the added agents would here equal 83½% of the total volume of the finished solution. The mixing tank may then be closed and permitted to stand 24–48 hours during which period it may be mixed once or twice. The solution may then be filtered through a 20 micron stainless steel filter to produce the final liquid product. One teaspoon (5 ml.) of such solution would assay 291.5 mg. of salicylic acid equivalent and 219.8 mg. of choline equivalent. Expressed in another fashion, each teaspoonful of the choline salicylate solution has the equivalent salicylate content of 6 grains of aspirin. Hence the solution thus obtained is ideal for the usual dosages in the situations where aspirin is administered in 5 grain tablets. For children of approximately 6–12 years of age where the aspirin dose would be 2½ grains every four hours, a half teaspoonful of the present formulation could be used. Where infants were involved (taking as an example a 15 lb. infant) the dose would be 0.75 ml. (approximately 12 drops) every four hours.

Where high salicylate dosages are given, usually by administering sodium salicylate in quantities of 2 grams four times daily, for each 2 grams of sodium salicylate there may be substituted two tablespoonsful (each 15 ml.) of the choline salicylate solution described.

Of course, an alternate means of changing the dosage is to change the concentration of the solution. Thus, if twice as much is desired in each unit of volume (e.g. it is desired to have 5 ml. contain the same quantity of active ingredients as 10 ml. of the above described solution) then one need only consider the primary solution as comprising 33% of the total volume and dilute accordingly. Similarly, a lesser concentration may be achieved by greater dilution.

The great advantage of a stable aqueous solution of a very soluble salicylate salt is that a large amount of freedom is enabled in determining the concentrations of the solution. A unit dosage of choline salicylate, depending upon the condition being treated, ranges from one-quarter of a grain to four grams thereof. Such an amount of choline salicylate may be dissolved in 5 ml. of water. Hence, aqueous solutions of choline salicylate wherein the concentration ranges from one-quarter grain to four grams per 5 ml. represents the general range of solutions which are useful pharmaceutically. It is an added advantage of the method outlined in this example that it is substantially a one step process and that the final product needs no separation since the by-product is vented off as a gas. Obviously, there may be substituted for the choline bicarbonate any other salt of choline which when reacted with salicylic acid will give off a gas which is inert with respect to the ingredients of the reaction.

By appropriate adjustment of the ratio of solute to solvent, the unit dose may either be increased or decreased to suit the particular needs. Thus, it may be desirable to concentrate this mixture so that 0.3 cc. or five drops, provide the necessary dosage. Such a preparation, administered in drop quantities, would be particularly convenient for treating infants. This formulation, moreover, blends well with milk and pediatric formulae in contrast to the strongly acid solutions of salicyclic acid.

EXAMPLE 3

If it is desired to administer a solid preparation of choline salicylate, it may be compounded into either a tablet or a capsule. These solid preparations require no special procedures or techniques other than those well known to the art for dealing with hydroscopic materials. The range in effective dosage is from 100 mgms. to 4 grams, administered as tablets or capsules three to five times daily.

EXAMPLE 4

Choline salicylate is capable of passing across the epidermal skin barrier to cause an effective blood level when administered by an inunction. It is desirable to use a water-soluble hydrophilic ointment base such as USP hydrophilic ointment base, containing a concentration of at least five to ten percent of choline salicylate per gram. The active ingredient is incorporated with the ointment base through the process of levigation and the resultant smooth, homogeneous ointment base is applied to the skin by inunction.

Because of its superior penetrating powers, this preparation may also be effectively utilized to combat local pains associated with rheumatism and arthritis. In these instances, it is desirable to apply the ointment directly to the affected part with vigorous massage to assure thorough contact between the choline salicylate ointment and the skin. The blood level of choline salicylate obtained in this manner is sufficient to cause the desired therapeutic effect.

EXAMPLE 8

Because choline salicylate avoids the local irritation of salicyclic acid to mucous membrane, administration by the suppository route, in order to achieve elevated blood levels of salicylate, becomes most desirable and practical. Choline salicylate is mixed with a sufficient quantity of the conventional suppository bases, as for example, cocoa butter or a water-miscible carbowax type, which is then shaped and subdivided into units for rectal administration.

The typical procedure for preparing suppositories of choline salicylate consists of mixing 87.14 grams of choline salicylate with 132.86 grams of melted cocoa butter or carbowax. The mixture is poured into a mold and cooled. Each suppository weighs 2.2 grams and contains 871.4 mgms. of choline salicylate.

The dosage, by the suppository route, varies with the individual patient and generally ranges from 100 to 3000 mgs. of choline salicylate per suppository to be administered three to six times daily.

When a water-soluble suppository base is desired, choline salicylate may be dissolved in a small amount of water and incorporated with the selected suppository base or added as a solid salt to the base. The dosage and the percent concentration of the active ingredient in each suppository is the same, whether a water-soluble or a water-insoluble base is used.

EXAMPLE 9

The fact that choline salicylate may form a stable aqueous solution makes it an ideal vehicle for a whole host of active pharmaceutical agents which are compatible with it and may advantageously be administered along with it. Just a few of the possible combinations follow by way of example:

(a)

| | | |
|---|---|---|
| Potassium guiacol sulfonate | grams | 7.80 |
| Choline salicylate solution | ml | 120.0 |

(b)

| | | |
|---|---|---|
| Codeine phosphate | grams | 0.39 |
| Ammonium chloride | do | 7.80 |
| Choline salicylate solution | ml | 120.0 |

(c)

| | | |
|---|---|---|
| Tinct. belladonna | ml | 15.0 |
| Choline salicylate solution | ml | 105.0 |

(d)

| | | |
|---|---|---|
| Sodium phenobarbital | grams | 0.39 |
| Choline salicylate solution | ml | 120.0 |

(e)

| | | |
|---|---|---|
| Penicillin G potassium | million units | 1.2 |
| Choline salicylate solution | ml | 60.0 |

(f)

| | | |
|---|---|---|
| Pyrilamine maleate | grams | 0.60 |
| Choline salicylate solution | ml | 120.0 |

(g)

| | | |
|---|---|---|
| Oral trisulfapyrimidines suspension, USP | ml | 120.0 |
| Choline salicylate solution | ml | 60.0 |

(h)

| | | |
|---|---|---|
| Cetyldimethylbenzeneammonium chloride | mg | 360.0 |
| Choline salicylate solution | ml | 120.0 |

(i)

| | | |
|---|---|---|
| Choline salicylate solution | ml | 60.0 |
| Chlorpheniramine maleate | gms | 0.048 |
| 1-Phenylephrine hydrochloride | mg | 120.0 |
| Caffeine citrate | mg | 388.8 |
| Ascorbic acid | mg | 480.0 |
| N-acetyl-p-aminophenol | mg | 1920.0 |
| Distilled water q.s. ad | ml | 120.0 |

(j)

| | | |
|---|---|---|
| Chlorpheniramine maleate | gms | 0.048 |
| Choline salicylate solution | ml | 120.0 |

(k)

| | | |
|---|---|---|
| Chlorpheniramine maleate | gms | 0.048 |
| Ammonium chloride | gms | 2.04 |
| Choline salicylate solution | ml | 120.0 |

(l)

| | | |
|---|---|---|
| Chlorpheniramine maleate | gms | 0.048 |
| Guayanesin | gms | 1.56 |
| Sodium citrate | gms | 1.56 |
| Choline salicylate solution | ml | 120.0 |

(m)

| | | |
|---|---|---|
| Strontium lactate | gms | 15.6 |
| Choline salicylate solution | ml | 120.0 |

(n)

| | | |
|---|---|---|
| Codeine sulfate | gms | 0.26 |
| Choline salicylate solution | ml | 120.0 |

(o)

| | | |
|---|---|---|
| Phenobarbital | gms | 0.36 |
| Choline salicylate solution | ml | 120.0 |

(p)

| | | |
|---|---|---|
| Chlorpheniramine maleate | gms | 0.048 |
| 1-Phenylephrine hydrochloride | gms | 0.12 |
| Choline salicylate solution | ml | 120.0 |

(q)

| | | |
|---|---|---|
| Choline salicylate solution | ml | 120.0 |
| Mixed essential oils | gms | 12.0 |
| Methyl nicotinate | gms | 1.2 |

In each case, except in (h) by "choline salicylate solution" is meant an aqueous solution of choline salicylate in the concentration of 871.4 mg. of choline salicylate per 5 ml. of solution.

Of course, the proportions of the above formulations may be varied, it being intended only to indicate how broadly choline salicylate solution may be employed as a vehicle. Of course, the concentration of the choline salicylate solution may also be varied.

The present application is a continuation-in-part of applicant's co-pending United States patent application Serial No. 718,436, filed March 3, 1958.

Although the present invention has been described with a certain degree of particularity, it is understood that the present disclosure has been made only by way of example and that numerous variations may be employed without transcending the scope of the invention as hereinafter claimed.

What is claimed is:

1. The method of elevating blood salicylate ion levels which comprises the administration of from one-quarter grain to four grams of choline salicylate and a pharmaceutical carrier.

2. The method of reducing fever by elevating blood salicylate ion levels which comprises the administration of from one-quater grain to four grams of choline salicylate and a pharmaceutical carrier.

3. The method of inducing analgesia by elevating blood salicylate ion levels which comprises the administration of from one-quarter grain to four grams of choline salicylate and a pharmaceutical carrier.

4. The method of reducing inflammation by elevating blood salicylate ion levels which comprises the administration of from one-quarter grain to four grams of choline salicylate and a pharmaceutical carrier.

5. A composition useful for therapeutic administration comprising choline salicylate, a liquid pharmaceutical carrier therefor and a second compatible active pharmaceutical agent.

6. The composition of claim 5 wherein said second active agent is an antiseptic.

7. The composition of claim 5 wherein said second active agent is an antibiotic.

8. The composition of claim 5 wherein said second active agent is a sedative.

9. The composition of claim 5 wherein said second active agent consists of an agent selected from the group consisting of antihistaminics, decongestants, expectorants, stimulants, calcifying agents, topical vasodilators, and analgesics, vitamins.

References Cited in the file of this patent

FOREIGN PATENTS 8,031     Great Britain _____ 1914

OTHER REFERENCES

Wilson et al., "Amer. Drug. Index," 1960, J. B. Lippincott Co., Philadelphia, page 74, col. 1.